United States Patent [19]

Landoll

[11] 4,228,277

[45] Oct. 14, 1980

[54] MODIFIED NONIONIC CELLULOSE ETHERS

[75] Inventor: Leo M. Landoll, Wilmington, Del.

[73] Assignee: Hercules Incorporated, Wilmington, Del.

[21] Appl. No.: 11,613

[22] Filed: Feb. 12, 1979

[51] Int. Cl.$^3$ ............... C08B 11/08; C08B 11/193
[52] U.S. Cl. ............................... 536/90; 536/88; 536/91
[58] Field of Search ............... 536/87, 88, 90, 91

[56] References Cited

U.S. PATENT DOCUMENTS

| | | | |
|---|---|---|---|
| 2,010,818 | 8/1935 | Hahn | 536/91 |
| 3,091,542 | 5/1963 | Anderson | 106/188 |
| 3,272,640 | 9/1966 | Geurden | 260/16 |
| 3,435,027 | 3/1969 | Desmarais et al. | 536/66 |
| 3,824,085 | 7/1974 | Teng et al. | 44/7 B |
| 3,894,839 | 7/1975 | Marmer et al. | 536/66 |
| 3,960,514 | 6/1976 | Teng et al. | 44/7 B |
| 4,107,426 | 8/1978 | Gordon | 536/88 |

*Primary Examiner*—Ronald W. Griffin
*Attorney, Agent, or Firm*—William S. Alexander

[57] ABSTRACT

Cellulose ethers are disclosed which have sufficient nonionic substitution to render them water soluble and which are further modified with a $C_{10}$ to $C_{24}$ long chain alkyl group in an amount between about 0.2% by weight and the amount which makes them less than 1% soluble in water. Hydroxyethyl cellulose is a preferred water-soluble cellulose ether for modification according to the invention. These products exhibit substantially improved viscosifying effect compared to their unmodified cellulose ether counterparts and also exhibit some surface activity.

6 Claims, No Drawings

MODIFIED NONIONIC CELLULOSE ETHERS

This invention relates to a new class of modified water-soluble polymers. Specifically it relates to modified water-soluble cellulose ethers.

Nonionic water-soluble cellulose ethers are employed in a wide variety of industrial applications, as thickeners, as water retention aids, and as suspension aids in certain polymerization processes, among others. For some of these applications, specific cellulose ethers are required, but for many, different ethers can be employed, depending upon price and in many cases simply on the preference of the user. Widely used, commercially available nonionic cellulose ethers include methyl cellulose, hydroxypropyl methyl cellulose, hydroxethyl cellulose, hydroxypropyl cellulose and ethyl hydroxyethyl cellulose.

As is generally the case with high polymers, better thickening efficiency is realized with higher molecular weight cellulose ethers. Production of very high molecular weight materials requires the use of more expensive cellulose furnishes such as cotton linters in lieu of the more common wood pulp types. Moreover, even when very high molecular weight furnishes are employed, the etherification process is extremely harsh on the furnish and causes significant reductions in the molecular weight of the cellulose. High viscosity solutions then become difficult to obtain without resorting to follow-up steps such as crosslinking. This is not a practical alternative with nonionic cellulosics since good crosslinking techniques are not known and those that are known are troublesome and inefficient. The only other way presently known for attaining high viscosity is to use high concentrations of the polymer. This technique is frequently inefficient, impractical, and otherwise undesirable.

It is the object of this invention to provide nonionic cellulose ethers of relatively low molecular weight which are capable of producing highly viscous aqueous solutions in practical concentrations. It is a further object to produce such cellulose ethers which additionally exhibit a relatively high degree of surface activity compared to that of more conventional nonionic water-soluble cellulose ethers.

The cellulose ethers of this invention are nonionic cellulose ethers having a sufficient degree of nonionic substitution selected from the class consisting of methyl, hydroxyethyl and hydroxypropyl to cause them to be water-soluble and which are further substituted with a hydrocarbon radical having about 10 to 24 carbon atoms in an amount between about 0.2 weight percent and the amount which renders said cellulose ether less than 1% by weight soluble in water. The cellulose ether to be modified is preferably one of low to medium molecular weight, i.e., less than about 800,000 and preferably between about 20,000 and 500,000 (about 75 to 1800 D.P.).

Cellulose ethers have heretofore been modified with small hydrophobic groups such as ethyl, butyl, benzyl and phenylhydroxyethyl groups. Such modifications or such modifield products are shown in U.S. Pat. Nos. 3,091,542; 3,272,640; and 3,435,027 inter alia. These modifications are usually effected for the purpose of reducing the hydrophilicity and thus reducing the hydration rate of the cellulose ether. These modifiers have not been found to effect the property improvements caused by the modifications contemplated by this invention. This is to say, there is no significant alteration of the rheological properties or the surface-active properties of the ether.

Any nonionic water-soluble cellulose ether can be employed as the cellulose ether substrate used to form the products of this invention. Thus, e.g., hydroxyethyl cellulose, hydroxypropyl cellulose, methyl cellulose, hydroxypropyl methyl cellulose, ethyl hydroxyethyl cellulose, and methyl hydroxyethyl cellulose can all be modified. The amount of nonionic substituent such as methyl, hydroxyethyl or hydroxypropyl does not appear to be critical so long as there is sufficient to assure that the ether is water soluble.

The preferred cellulose ether substrate is hydroxyethyl cellulose (HEC) of about 50,000 to 400,000 molecular weight. Hydroxyethyl cellulose of this molecular weight level is the most hydrophilic or the materials contemplated. It can thus be modified to a greater extent than can other water-soluble cellulose ether substrates before insolubility is achieved. Accordingly, control of the modification process and control of the properties of the modified product can be more precise with this substrate. Hydrophilicity of the most commonly used nonionic cellulose ethers varies in the general direction: hydroxyethyl hydroxypropyl hydroxypropyl methyl methyl.

The long chain alkyl modifier can be attached to the cellulose ether substrate via an ether, ester or urethane linkage. Preferred is the ether linkage as the reagents most commonly used to effect etherification are readily obtained, the reaction is similar to that commonly used for the initial etherification, and the reagents are usually more easily handled than the reagents employed for modification via the other linkages. The resulting linkage is also usually more resistant to further reactions.

Methods of preparing mixed ethers of cellulose, i.e., products having more than one etherifying modifier attached to the same cellulose molecule are known to the art. The products of this invention can be prepared via essentially the same methods. Briefly, the preferred procedure for preparing the mixed ethers of this invention comprises slurrying the nonionic cellulose ether in an inert organic diluent such as a lower aliphatic alcohol, ketone, or hydrocarbon and adding a solution of alkali metal hydroxide to the resultant slurry at a low temperature. When the ether is thoroughly wetted and swollen by the alkali, a $C_{10}$ to $C_{24}$ epoxide is added and the reaction is continued, with agitation, until complete. Residual alkali is then neutralized and the product is recovered, washed with inert diluents, and dried. The etherification can also be effected with a $C_{10}$ to $C_{24}$ halide or halohydride but these are sometimes less reactive, less efficient and more corrosive so it is preferred to use the epoxide.

Substantially the same procedure is used to attach the hydrocarbon modifier via the ester or urethane linkage. Conventional slurry methods of reacting this type of modifier with cellulose ethers, i.e., without the alkali, are ineffective. The alkali steep is required in order to assure that the cellulose ether is swollen to the point that the modifier can react substantially uniformly on all cellulose ether molecules throughout. If reaction is not substantially uniform throughout the cellulose ether mass, the improved rheological properties are not realized.

Although the products of this invention are referred to as being "long chain alkyl group modified", it will be recognized that except in the case where modification is effected with an alkyl halide, the modifier is not a simple long chain alkyl group. The group is actually an alphahydroxyalkyl radical in the case of an epoxide, a urethane radical in the case of an isocyanate, or an acyl radical in the case of an acid or acyl chloride. Nonetheless, the terminology "long chain alkyl group" is used since the size and effect of the hydrocarbon portion of the modifying molecule complete obscure any noticeable effect from the connecting group. Properties are not significantly different from those of the product modified with the simple long chain alkyl group.

EXAMPLES 1 to 10

To a one-liter jacketed resin kettle, fitted with an air stirrer, argon inlet-vacuum takeoff valve, equilibrating addition funnel, and Friederich condenser vented through oil filled gas bubbler, were charged 80 grams of low molecular weight (I.V. 1.5) hydroxyethyl cellulose (HEC) of 2.5 M.S., and 500 ml. of degassed isopropyl alcohol (IPA). After stirring to slurry the HEC, the system was evacuated and filled with argon three times, finally leaving the system under slight argon positive pressure. A solution of 25.6 g. of NaOH in 464 ml. of $H_2O$, degassed and charged to the addition funnel, was added, dropwise, at 0°-5° C. over 45 minutes. The slurry was stirred overnight at 0°-5° C. (using a refrigeration unit) to allow equilibrium swelling. The desired alkyl epoxide was dissolved in 30-50 cc. of degassed IPA, charged to the addition funnel, and added over 5 minutes. The slurry was then heated at time and temperature conditions specified in Table I.

Upon completion of the reaction, the slurry was cooled with circulating tap water. The diluent was removed by vacuum filtration using a filter stick. When large amounts of epoxide (>20 g.) were used, a hexane wash followed. The remaining solids were diluted with 500 ml. of 90% aqueous acetone, and adjusted to pH 8 with concentrated $HNO_3$. The final adjustment to a phenol-phthalein endpoint was made with acetic acid. The diluent was filtered out, and the solids washed twice with 500-cc. portions of 80% aqueous acetone, allowing 30 minutes steeping time for each wash. Finally, the solids were washed with 100% acetone, filtered dry, and vacuum dried. The products were usually tan powders.

Simultaneously a control speciment of HEC was subjected to the reaction conditions in the absence of modifying reagents to monitor the degradative effect of the reaction on its viscosity.

Pertinent data are recorded in Table I.

TABLE I

| Example No. | Epoxide Length | Wt. (g.) | Reaction Time (Hrs.) | Wt. % Modifier | Average No. of Modifiers/Chain* | 2% Solution Viscosity (cps.) |
|---|---|---|---|---|---|---|
| Control | — | — | 3 | 0 | 0 | 12 |
| 1 | $C_{10}$ | 32 | 4.5 | 4.0 | 22.5 | 12.6 |
| 2 | $C_{12}$ | 20 | 2 | 1.28 | 6.1 | 17.5 |
| 3 | $C_{12}$ | 32 | 3.5 | 2.4 | 11.4 | 450 |
| 4 | $C_{12}$ | 32 | 5 | 3.4 | 16.2 | INS. |
| 5 | $C_{14}$ | 32 | 4.5 | 2.43 | 9.9 | 815 |
| 6 | $C_{14}$ | 32 | 5 | 4.75 | 19.38 | INS. |
| **7 | $C_{20-24}$ | 40 | 2 | 0.25 | 0.7 | 15 |
| 8 | $C_{20-24}$ | 40 | 2 | 0.76 | 2.2 | 700 |
| 9 | $C_{20-24}$ | 40 | 4 | 1.10 | 3.1 | 30,000 |
| 10 | $C_{20-24}$ | 50 | 4 | 1.73 | 4.9 | INS. |

*Average number of modifiers per chain = $\frac{wt. \%}{100} \times \frac{Polymer\ MW}{Modifier\ MW}$

**This reaction carried out in different reactor with less efficient control of conditions

EXAMPLES 11 to 14

Viscosity measurements were made on low molecular weight hydroxyethyl cellulose (~300 D.P.) specimens modified according to the procedure of Examples 1 through 11. To illustrate the improved viscosity-concentration relationship of the materials, 2 and 3% solutions were prepared and viscosities were compared with those of conventional unmodified low molecular weight HEC. Pertinent data are shown in Table II.

TABLE II

| Example No. | Modifier | Wt. % Modifier | Avg. No. of Modifiers/Chain | 2% Viscosity | 3% Viscosity |
|---|---|---|---|---|---|
| Control | — | — | — | 10 cps. | 20 cps. |
| 11 | $C_{10}$ | 1.70 | 9.6 | 18 cps. | 44.5 cps. |
| 12 | $C_{12}$ | 1.28 | 6.1 | 17.5 cps. | 60 cps. |
| 13 | $C_{12}$ | 1.82 | 8.7 | 34 cps. | 126 cps. |
| 14 | $C_{20}$ | 0.19 | 0.5 | 9 cps. | 96 cps. |

EXAMPLE 15

Methyl cellulose having a molecular weight of about 40,000 (D.P. about 200) and a 2% aqueous solution viscosity of about 400 cps. was modified by reacting it according to the procedure of Examples 1 through 10 above with a $C_{12}$ epoxide for 3.5 hours until the product contained about 1.8% by weight of the hydrophobic modifier (average of 4.3 modifier molecules per polymer chain). The viscosity of a 2% solution of the modified product was 22,500 cps.

A second specimen modified in the same manner to contain 2.8% modifier (average 6.7 per chain) was insoluble.

EXAMPLE 16

The same methyl cellulose used in Example 15 was modified with a $C_{20-24}$ (average $C_{21}$) epoxide mixture. At 0.25% modifier (0.35 modifier/chain), the viscosity of a 2% solution of the product was 100,000 cps. At 1.6% modifier (2.2 modifiers/chain) the product was insoluble.

EXAMPLE 17

Methyl hydroxypropyl cellulose (M.W. ~26,000, methyl D.S. 1,3, hydroxypropyl M.S. ~0.2) was modified with 0.67 weight percent of the $C_{20-24}$ modifier (0.59 modifier/-chain). The viscosity of a 2% solution of this product was 29,000 cps. compared to 100 cps. for the starting material.

EXAMPLE 18

Forty parts hydroxypropyl cellulose (M.W. ~75,000, M.S. ~3.5) was dissolved in 395 parts isopropanol with 1.5 parts NaOH and 2 parts $H_2O$. Twenty-five parts $C_{20-24}$ epoxide was added and allowed to react for 2.5 hours at 75° C. After cooling, the reaction mass was cooled and precipitated in hexane. The product recovered contained 0.8 weight % of $C_{20-24}$ modifier (2.04 modifiers/chain). Its 2% solution viscosity was 5650 cps. compared to 15 cps. for the unmodified starting material.

EXAMPLE 19

Hydroxyethyl cellulose (MW=80,000, M.S.=1.8) (25 parts) was dissolved in 468 parts dry dimethylacetamide. Oleyl chloride (0.40 part) was added and the solution stirred 24 hours at ambient conditions. The product was recovered by precipitating in acetone. Two percent Brookfield viscosity of the product was 7900 cps. compared to 10 cps. for the starting material. The level of modification was 1.4% (~5.2 modifiers per chain).

EXAMPLE 20

Example 19 was repeated using stearyl isocyanate (0.5 gram) in place of oleyl chloride. The final product contained 0.86% of $C_{18}$ modifier (2.6 modifiers/chain) and had a 2% Brookfield viscosity of 200 cps.

EXAMPLE 21

Example 19 was repeated using hydroxypropyl cellulose (M.W. 75,000, M.S. ~4) in place of HEC, and stearyl chloride (1.0 g.) in place of oleyl chloride. The product obtained had a 2% Brookfield viscosity of 1750 cps. compared to 20 cps. for the starting material, and contained 1.5% stearyl groups (~4.5 modifiers/chain).

EXAMPLE 22

HEC was modified according to the procedure of Example 2 using a higher molecular weight starting material. The product had an MW=190,000, contained 0.85% by weight $C_{20-24}$, and had a Brookfield viscosity of 15,200 cps. An unmodified HEC, MW=240,000, has a Brookfield viscosity of 400 cps. by comparison.

EXAMPLE 23

A slurry of 34.5 parts wood pulp, 241.2 parts t-butyl alcohol and 26.1 parts acetone with a solution of 11 parts NaOH in 52 parts water was agitated for 30 minutes at room temperature. Ethylene oxide (38.9 parts) was added and the slurry was heated with agitation to 75° C. for one hour, following which 25 parts of $C_{14}$ epoxide was added. This slurry was heated at 50° for 3 hours. After cooling, the product was neutralized, washed with hexane and aqueous acetone, then dried. The product contained 0.55% $C_{14}$, had an intrinsic viscosity of 3.45, and 2% solution viscosity of 70,000 cps. Hydroxyethyl cellulose of comparable intrinsic viscosity has 2% solution viscosity of approximately 500 cps.

EXAMPLE 24

The modified hydroxyethyl cellulose identified above as Example 14 was dissolved in water to form a 2% by weight solution. Sixty parts of this solution was used to prepare a 40/60 mineral oil/water emulsion by passing it through a laboratory size hand homogenizer. This emulsion was stable for more than 48 hours. A similar emulsion prepared in the same way with an unmodified hydroxyethyl cellulose emulsion broke in less than 15 minutes.

EXAMPLE 25

A low pH hair shampoo was prepared using the following recipe which, except for the thickener, represents a commercially available shampoo which is difficult to thicken and with which conventional HEC is incompatible:

| | |
|---|---|
| N-carboxymethyl, N-ethoxyacetic acetic[1] acid substituted 2-dodecyl imidazoline (40% solution) | 30 parts |
| Lauryl sulfate triethanolamine (40% solution) | 8 parts |
| Lauric diethanolamine | 5 parts |
| $\left[ \begin{array}{c} O \quad\quad CH_3 \\ \| \quad\quad\quad \| \\ R-C-NH(CH_2)_3-N-C_2H_5 \\ \| \\ CH_3 \end{array} \right] C_2H_5SO_4$  R = lanolin radical [2] | 12 parts |
| Propylene glycol | 6.5 parts |
| Thickener solution (2%) | 38.5 parts |

[1]Miranol H2MSF (Mirand Chemical Co.)
[2]Lanoquat DES25 (Malstrom Chemicals)

The first four ingredients were combined and heated to 70° C. with agitation for four minutes. The warm blend was then stirred into the thickener solution at room temperature followed by addition of the propylene glycol. Stirring was continued for about ten minutes at which time the viscosity was checked with a Brookfield viscometer. Viscosity was rechecked after five weeks room temperature storage. A control containing no thickener and several shampoos thickened with HEC modified according to the invention were prepared. Viscosities and other pertinent data are recorded in the following table.

| Example No. | Modifier | Wt. % on HEC | I.V. | Shampoo Viscosity | Appearance |
|---|---|---|---|---|---|
| Control | — | — | — | 56 cps. | Clear |
| 24-a | $C_{12}$ | 2.42 | 1.3 | 330 cps. | Clear |
| 24-b | $C_{16}$ | 1.35 | 1.4 | 700 cps. | Clear |
| 24-c | $C_{14}$ | 2.91 | 1.4 | 950 cps. | Clear |

EXAMPLE 26

A number of flat white interior arcylic latex paint formulations were prepared as follows: A premix recipe consisting of the following ingredients

| | |
|---|---|
| Water | 3.83 parts |
| Potassium tripolyphosphate | .12 part |
| Dispersing aid (30% solids)* | .55 part |
| Ethylene glycol | 1.20 parts |
| Hexamethylene glycol | 2.85 parts |
| Defoamer | .16 part |
| Cellulose ether thickener solution | 10.61 parts |

*Sodium salt of polyacrylic acid(TAMOL 850 - Rohm & Haas)

was prepared by mixing thoroughly at 1800 r.p.m. on a Cowles Mixer. To this was added, still at 1800 r.p.m.,

| | |
|---|---|
| $TiO_2$ | 24.43 parts |
| Anhydrous aluminum silicate | 6.12 parts |
| Silica | 5.71 parts |

When the pigments were mixed thoroughly, the agitator speed was increased to 3500 r.p.m. for 20 minutes to homogenize with mixture. After 20 minutes' mixing, there was added with low speed stirring until completely incorporated:

| Acrylic latex | 38.35 parts |
|---|---|
| Water | 1.20 parts |
| Stabilizer | .06 part |
| Defoamer | .08 part |
| Cellulose ether thickener solution | 4.65 parts |

The cellulose ether solution concentration was varied as required to vary the concentration of cellulose ether in the formulation.

Details as to thickener added and the properties resulting are tabulated in the following table:

| Example No. | Thickener Description | | | Paint Properties | |
|---|---|---|---|---|---|
| | Conc. | Modifier | Amount | Stormer Viscosity* | Spatter** |
| Control[1] | 1.2% | None | — | 100 K.U. | — |
| 25a | .23% | $C_{20}$ | 1.1% | 88 K.U. | 10 |
| 25b | .2% | $C_{20}$ | 1.16% | 111 K.U. | 9 |
| Control[2] | .22% | None | — | 94 K.U. | 3 |

*ASTMD-562-55
**ASTME-2486-74-A
[1]Hydroxyethyl cellulose - medium viscosity type
[2]Hydroxyethyl cellulose - low viscosity type
[3]Substrate for thickener was low viscosity type HEC, 2.5 M.S.
[4]Substrate for thickener was medium viscosity type HEC, 2.5 M.S.

Several notable and unusual effects have been observed to be caused by the products of this invention in aqueous media. The increased viscosity of the products compared to their unmodified counterparts has already been mentioned. Beyond the optimum modification for maximum viscosity, further modification leads to loss of viscosity and insolubility.

For a given modification level, there is a greater viscosity increase relative to the unmodified polymer as the polymer concentration increases. That is to say, as the solution concentration is increased from 1 to 3%, or higher, a greater viscosity increase is noted with the products of the invention than with their unmodified counterparts. This behavior is shown in Examples 11 to 14. Thus, a lightly modified polymer, whose viscosifying power at 1% is insignificant, can effect useful viscosity increases at higher concentrations even though the same polymer, unmodified, might still not be useful at the higher concentration.

The modified products of the invention also display a degree of surface activity not exhibited by unmodified nonionic cellulose ethers. This is believed to be due to the relatively long unsubstituted and uninterrupted carbon chain attached thereto which is not present in the unmodified substrate. The products appear to be analogous to known surfactants having hydrophilic moieties combined with extended hydrophobic carbon chains. In fact, the behavior of the modified polymers in exhibiting surface activity, as well as their rheological character, suggest that the long chain modified molecules are aggregated into micelle-like clusters in aqueous solution much as is known to happen in the case of more conventional surfactants.

The surface activity of the modified cellulose ethers of the invention is observed particularly with non-polar suspended matter. For example, emulsions of mineral oils in water prepared with the products of the invention are stable for extended periods as shown in Example 24 above. Enzymatic degradation of the cellulose substrate is observed in some instances before such emulsions break. Surface activity is also noticeable to a significant degree with latex paints where the long-chain alkyl substituted products show a tendency to adsorb on non-polar latex particles.

Another interesting characteristic of the modified cellulose ethers of this invention is their ability to interact with nonionic surfactants so that their viscosifying power is further and very dramatically increased. Thus, materials of very low degree of long chain alkyl modification can cause viscosity increases of 1000-fold and more in the presence of such surfactants. This behavior, which is rarely exhibited by unmodified nonionic cellulose ethers, can be of significant commercial value in many applications, for example, detergent systems and shampoos.

The minimum amount of modification which has been found to be useful for effecting viscosity changes is about 0.2% by weight. Below this level increases in viscosifying power appear to be limited to instances where the polymer is used at impractically high concentrations. Moreover, this is a practical limit based on the cost of effecting the modification compared to the improvement realized. It will also be recognized that this minimum level of modification will apply only in the case where the carbon number of hydrophobic modifier is on the higher end of the permissible range, i.e. about 20 to 24. In the case of these higher hydrophobes, 0.2% modifier is the lower practical limit to provide useful property changes. It is theorized that so little modifier is present in this case that polymer chains do not aggregate. For whatever reason, little rheological effect is noted. A preferred lower limit of modification is about 0.4% for the smaller hydrophobes as these are generally less effective in obtaining useful property changes than the larger hydrophobes.

Modifier content (wt. %) is determined using a modified Zeisel method. Ether-bound hydrophobe is cleaved by use of 35% HBr in acetic acid. Brominated hydrocarbon reaction product is extracted with hexane and analyzed via a temperature programmed flame ionization instrument.

The maximum weight percent of modifier which can be added to the cellulose ether is determined principally by the size of the long chain alkyl modifier and to a lesser extent by the molecular weight and the hydrophilicity of the cellulose ether substrate. The amount of modifier is best expressed in terms of the average number of modifiers per polymer chain. It has been experimentally determined that for all nonionic water-soluble cellulose ethers, the relationship between the amount which results in insolubility ($N_{INS}$) and modifier carbon number $C_n$ is defined by the formula:

$$\log N_{INS} = K - 0.07 \pm 0.005 \, C_N$$

The constant K varies from about 1.3 to 2.3 preferably about 1.4 to 2.1 and is a function of the hydrophilicity of the cellulose ether substrate. K is about 1.5 to 1.8 for methyl cellulose, about 1.9 to 2.2 for hydroxyethyl cellulose of low to medium D.P. and about 1.4 for hydroxypropyl cellulose and hydroxypropyl methyl cellulose.

Overall, $N_{INS}$ varies from about 1 to 25. A range can be calculated within this overall range for each water-soluble cellulose ether which is usable in the invention. Thus, for methyl cellulose (K=1.8) $N_{INS}$ is about 13 when a $C_{10}$ hydrocarbon modifier is employed and about 3 when the modifier has 20 carbon atoms. $N_{INS}$ for medium D.P. hydroxyethyl cellulose is about 25 with a $C_{10}$ hydrocarbon modifier and about 5 with a $C_{20}$ modifier.

Modified cellulose ethers of this invention are useful as stabilizers in emulsion polymerizations, as thickeners in cosmetics, and as flocculants in mineral processing. One particularly good utility is as a thickener in latex paint. Very small amounts of low molecular weight modified nonionic cellulose ethers of this invention can outperform larger quantities of higher molecular weight conventional nonionic cellulose ethers.

What I claim and desire to protect by Letters Patent is:

1. A nonionic cellulose ether having a sufficient degree of nonionic substitution selected from the class consisting of methyl, hydroxyethyl and hydroxypropyl to cause it to be water-soluble and being further substituted with a long chain alkyl radical having 10 to 24 carbon atoms in an amount between about 0.2 weight percent and the amount which renders said cellulose ether less than 1% by weight soluble in water.

2. The nonionic cellulose ether of claim 1 wherein the long chain alkyl radical is attached via an ether linkage.

3. Water-soluble hydroxypropyl cellulose substituted with a long chain alkyl radical having 10 to 24 carbon atoms in an amount between about 0.2 weight percent and the amount which renders the hydroxypropyl cellulose less than 1% by weight soluble in water.

4. Water-soluble hydroxyethyl cellulose substituted with a long chain alkyl radical having 10 to 24 carbon atoms in an amount between about 0.2 weight percent and the amount which renders the hydroxyethyl cellulose less than 1% by weight soluble in water.

5. The product of claim 3 wherein the hydroxyethyl cellulose prior to substitution with the long chain alkyl group has a molecular weight of about 50,000 to 400,000.

6. The product of claim 5 wherein the long chain alkyl group is attached via an ether linkage.

* * * * *

REEXAMINATION CERTIFICATE (1818th)

United States Patent [19]

Landoll

[11] B1 4,228,277

[45] Certificate Issued Oct. 20, 1992

[54] MODIFIED NONIONIC CELLULOSE ETHERS

[75] Inventor: Leo M. Landoll, Wilmington, Del.

[73] Assignee: Aqualon Company, Wilmington, Del.

Reexamination Request:
No. 90/002,356, Jun. 3, 1991

Reexamination Certificate for:
Patent No.: 4,228,277
Issued: Oct. 14, 1980
Appl. No.: 11,613
Filed: Feb. 12, 1979

[51] Int. Cl.⁵ .................. C08B 11/08; C08B 11/193
[52] U.S. Cl. ........................................ 536/90; 536/88; 536/91
[58] Field of Search .................. 536/90, 88, 91, 87

[56] References Cited

U.S. PATENT DOCUMENTS

| | | | |
|---|---|---|---|
| 2,102,205 | 12/1937 | Haskins et al. | 536/90 |
| 2,423,883 | 7/1947 | Fisher | 536/66 |
| 3,435,027 | 3/1969 | Desmarais et al. | 536/66 |
| 3,789,117 | 1/1974 | Tsujino et al. | 424/480 |
| 4,009,329 | 2/1977 | Arney et al. | 536/84 |

FOREIGN PATENT DOCUMENTS 1143893  2/1969  United Kingdom .

OTHER PUBLICATIONS

E. D. Klug "Some Properties of Water-Soluble Hydroxyalkyl Celluloses and Their Derivatives", *Journal of Polymer Science*, Part C, pp. 491–508 (John Wiley & Sons, Inc. 1971).

Hercules Incorporated, Research Center Progress Report, RI 04120 PD, "Natrosol Properties and Uses", Jul. 23, 1975.

*Primary Examiner*—Ronald W. Griffin

[57] ABSTRACT

Cellulose ethers are disclosed which have sufficient nonionic substitution to render them water soluble and which are further modified with a $C_{10}$ to $C_{24}$ long chain alkyl group in an amount between about 0.2% by weight and the amount which makes them less than 1% soluble in water. Hydroxyethyl cellulose is a preferred water-soluble cellulose ether for modification according to the invention. These products exhibit substantially improved viscosifying effect compared to their unmodified cellulose ether counterparts and also exhibit some surface activity.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 is confirmed.

Claims 5 and 6 having been finally determined to be unpatentable, are cancelled.

New claims 7 and 8 are added and determined to be patentable.

*7. The product of claim 4 wherein the hydroxyethyl cellulose prior to substitution with the long chain alkyl group has a molecular weight of about 50,000 to 400,000.*

*8. The product of claim 7 wherein the long chain alkyl group is attached via an ether linkage.*